United States Patent
Rehlaender et al.

(10) Patent No.: US 12,119,752 B2
(45) Date of Patent: Oct. 15, 2024

(54) ALTERNATING ASYMMETRICAL PHASE-SHIFT MODULATION

(71) Applicant: Delta Electronics (Thailand) Public Co., Ltd., Samutprakarn (TH)

(72) Inventors: Philipp Rehlaender, Paderborn (DE); Joachim Böcker, Berlin (DE); Roland Unruh, Paderborn (DE); Frank Schafmeister, Warburg (DE)

(73) Assignee: Delta Electronics (Thailand) Public Co., Ltd., Samutprakarn (TH)

( * ) Notice: Subject to any disclaimer, the term of this patent is extended or adjusted under 35 U.S.C. 154(b) by 208 days.

(21) Appl. No.: 17/806,085

(22) Filed: Jun. 9, 2022

(65) Prior Publication Data
US 2022/0399803 A1      Dec. 15, 2022

(30) Foreign Application Priority Data
Jun. 9, 2021   (EP) .................................... 21178636

(51) Int. Cl.
  *H02M 3/335*   (2006.01)
  *H02M 1/00*    (2007.01)
  *H02M 3/00*    (2006.01)

(52) U.S. Cl.
  CPC ..... *H02M 3/33573* (2021.05); *H02M 1/0054* (2021.05); *H02M 3/01* (2021.05)

(58) Field of Classification Search
  CPC .. H02M 1/0043; H02M 1/0054; H02M 1/327; H02M 3/01; H02M 3/33523; H02M 3/33573–33584; H02M 3/3376
  See application file for complete search history.

(56) References Cited

U.S. PATENT DOCUMENTS

| | | | |
|---|---|---|---|
| 6,310,912 B1* | 10/2001 | Maiocchi | H03M 1/825 375/238 |
| 2020/0083815 A1* | 3/2020 | Zhang | B60L 53/22 |
| 2021/0067045 A1* | 3/2021 | Zhang | H02M 3/33573 |

OTHER PUBLICATIONS

Yen-Shin Lai et al: "New thermal balance control techniques of phase-shift full-bridge converter", Energy Conversion Congress and Exposition (ECCE), 2012 IEEE, Sep. 15, 2012 (Sep. 15, 2012), pp. 3975-3980.

(Continued)

*Primary Examiner* — Fred E Finch, III
(74) *Attorney, Agent, or Firm* — CKC & Partners Co., LLC

(57) ABSTRACT

In order to balance the thermal stress of the switches (S1-S4) of the two legs of an inverter full bridge (4), the driving signals are generated using an up-down counter having a modulation period $T_{mod}$ of twice the period T of the input voltage (Vin). The up-down counter has a first compare value (41) of D/4 and a second compare value (42) of (2+D)/4, where D is the duty cycle and where the second half bridge is phase shifted by the period T.

20 Claims, 4 Drawing Sheets

(56) References Cited

OTHER PUBLICATIONS

Mihalache L: "A modified pwm control technique for full bridge ZVS DC-DC converter with equal losses for all devices", Industry Applications Conference, 39th IAS Annual Meeting. Confe rence Record of the 2004 IEEE Seattle, Oct. 3-7, 2004, Piscataway, NJ, USA, IEEE, vol. 3, Oct. 3, 2004 (Oct. 3, 2004), pp. 1776-1781.
Corresponding European Search Report mailed on Nov. 10, 2021.
Sergio Constantino Yáñez-Campos et al, "A Two-Grid Interline Dynamic Voltage Restorer Based on Two Three-Phase Input Matrix Converters", Applied Sciences, 2021, vol. 11, Issue 2, p. 561, https://doi.org/10.3390/app11020561.
Arash Khoshkbar Sadigh et al, "DSP based digital control of a set of phase-shifted full-bridge DC-DC converters", 2015 IEEE.
Related EPO Communication issued on Mar. 20, 2024.

\* cited by examiner

ALTERNATING ASYMMETRICAL PHASE-SHIFT MODULATION

CROSS-REFERENCE TO RELATED APPLICATIONS

This application claims priority to European Patent Application No. 21178636.3, filed on Jun. 9, 2021, which is hereby incorporated by reference in its entirety.

TECHNICAL FIELD

The disclosure relates to a method for controlling a converter including an inverter full bridge with a first input terminal, a second input terminal, a first half bridge and a second half bridge connected across the first and second input terminals, where a input voltage (Vin) having a period T is provided between the first and second input terminals and where each half bridge includes a first switch and a second switch connected in series between the first and second input terminals, where drive signals for the switches are generated with a pulse width modulation technique with a duty cycle D. The disclosure further relates to a converter including an inverter full bridge with a first input terminal, a second input terminal, a first half bridge and a second half bridge connected across the first and second input terminals, where each half bridge includes a first switch and a second switch connected in series between the first and second input terminals where the full bridge inverter further includes a drive signal generator for generating drive signals for the switches with a pulse width modulation technique with a duty cycle D.

BACKGROUND ART

Phase-shift modulated converters are widely applied for a variety of applications. Phase-shift modulation is for example used as the modulation mode of the phase-shifted full bridge converter and has also been applied for the LLC converter to reduce the gain in light load and to balance interleaved LLC converters under all load conditions in a single-stage architecture. In phase-shift modulation both half bridges (legs) of the inverter are operated with a duty cycle of about 50% where the modulation is phase-shifted for one leg to adjust the voltage transfer ratio.

While this is an easy-to-implement modulation, it has the disadvantage that the leading half bridge is always stressed with larger switching losses than the lagging leg. The leading leg is turned-off at a larger current whereas the lagging leg is turned-off at a substantially lower current since the current reduces in the freewheeling interval. This lower turn-off 5 current of the lagging leg may, furthermore, prevent zero voltage switching (ZVS) for the leading leg as the energy in the series inductance may not be large enough. This may also add to the switching losses. The larger switching losses result in a thermal imbalance of the switches of the leading leg and the lagging leg. The temperature of the switches of the leading leg are always larger.

Such an unequal stress of the switches may lead to an early fail of some switches and therefore of the whole inverter although most of the other components are still in good condition and the converter could continue to be operated with them.

In order to balance the switching losses, it has been suggested to interchange the leading leg with the lagging leg. However, an external control is necessary requiring a reprogramming of the PWM registers resulting in a non-closed control method.

SUMMARY

It is the object of the disclosure to create a converter and a method for controlling a converter pertaining to the technical field initially mentioned, that enables to reduce or even eliminate the thermal imbalance of the switches during operation thereby using a closed modulation method.

The solution of the disclosure regarding the control method is specified by the features of the following implementation. According to the disclosure, the drive signals for the switches (S1, S2, S3, S4) are generated with a pulse width modulation technique with a duty cycle D using an up-down 25 counter having a period $T_{mod}$ being twice the period T, a first compare value and a second compare value, where, the first switch (S1) of the first half bridge is switched ON at the first compare value on an up-count of the up-down counter, the first switch (S1) of the first half bridge is switched OFF at the second compare value on an up-count of the up-down counter, the first switch (S1) of the first half bridge is switched ON at the second compare value on a down-count of the up-down counter, the first switch (S1) of the first half bridge is switched OFF at the first compare value on the down-count of the up-down counter, a second switch (S3) of the first half bridge is switched interleaved to the first switch (S1) of the first half bridge, where the first compare value for the first half bridge is D/4 and where the second compare value for the first half bridge is (2+D)/4.

Accordingly, the disclosure proposes a closed modulation method lasting over two original periods of the input voltage. An up-down counter is used to generate the driving signals. The counter has the two compare values D/4 and (2+D)/4. In the resulting modulation, the turn-on events change from one compare event to the next.

In this way, the disclosure enables to create a simple-to-implement modulation method resulting in equal conduction and switching losses for all switches of the inverter full bridge. Through such a two-period-long modulation sequence the thermal imbalances can be largely reduced such that all switches are stressed equally resulting in the same or a similar temperature of the switches. Experimental measurement results prove the concept and show that this modulation results in much smaller temperature variations.

The drive signal generator is for example implemented using a microprocessor or the like. A digital signal processor (DSP) is preferably used as DSPs are optimized for such tasks.

In a preferred embodiment of the disclosure, the first switch and the second switch of the second half bridge are switched in the same way as the first and the second switch of the first half bridge but with different compare values where the first compare value for the second half bridge is (1−D/4) and where the second compare value for the second half bridge is (1−(2+D)/4).

In this case, the up-down counter is the same for both half bridges which means that no phase shift is applied between the two half bridges but that the compare values are different.

Instead of using different compare values for the two half bridges it is however also possible to use the same compare values for both half bridges. However, in this case, a phase shift between the up-down counter for first and the second half bridge has to be applied. It is for example also possible to use the above mentioned compare values for the first half bridge also as the compare values for the second half bridge but applying a phase shift that corresponds to the period T.

In a preferred embodiment of the disclosure, the up-down counter is ramped up from a minimum value to a maximum value during a first half of the modulator period $T_{mod}$ and then the up-down counter is ramped down from the maximum value to the minimum value during a second half of the modulator period $T_{mod}$. The minimum value is preferably zero and the maximum value is preferably 1. However, the minimum value and the maximum value may also be chosen with different values which then would require a suitable adaptation of the compare values. If for example the minimum value remains zero but the maximum value is chosen to be 2, the compare values would have to be doubled to achieve the same results.

This results in a triangle course of the up-down counter, which crosses both the first as well as the second compare value once for each rise and once for each fall.

The solution of the disclosure regarding the converter is specified by the features of the following implementation. According to the disclosure the drive signal generator includes an up-down counter having a first compare value, a second compare value and a period $T_{mod}$ being twice a period T of an input voltage (Vin) for providing between the first and second input terminals, where the drive signal generator is adapted for generating drive signals for the switches in accordance with the method according to the disclosure as outlined above, including also the preferred embodiments of the method.

Accordingly, the disclosure proposes a converter with a drive signal generator enabling a closed modulation method lasting over two original periods of the input voltage. An up-down counter is used to generate the driving signals. For the first half bridge, the counter has the two compare values D/4 and (2+D)/4. And as outlined above, the counter has preferably different compare values for the second half bridge, that is the first compare value for the second half bridge is (1−D/4) and the second compare value for the second half bridge is (1−(2+D)/4). In the resulting modulation, the turn-on events change from one compare event to the next.

In this way, the disclosure enables to create a simple-to-implement converter including an inverter full bridge which may be controlled using a modulation method resulting in equal conduction and switching losses for all switches of the inverter full bridge. Through such a two-period-long modulation sequence the thermal imbalances can be largely reduced such that all switches are stressed equally resulting in the same or a similar switch temperature.

The switches of the inverter full bridge are for example implemented using MOSFET switches such as for example silicon or silicon-carbide MOSFETs. Other types of MOSFETs or more generally, other types of transistors may however be used as well. The best choice for the implementation of the switches depends on the particular application.

In another preferred embodiment of the disclosure, the converter includes a transformer, a converter stage connected between the inverter full bridge and a primary side of the transformer, a rectifier connected to a secondary side of the transformer and an output stage connected to the rectifier, where an output power of the converter is provided across an output of the output stage.

The disclosure may be applied preferably in a converter having these elements. However, the disclosure may also be applied in a converter lacking one or more of these elements. For example a converter that provides an AC output power to another device which means that the converter must not necessarily have a rectifier prior to the output stage.

In most applications however, where the disclosure may be applied, the converter not only includes a transformer and a rectifier in the secondary of the transformer, but also a converter stage between the inverter full bridge and the transformer. That converter stage actually defines the type of converter including the inverter full bridge.

As mentioned above, the leading leg switches also turn-off at increased currents. The freewheeling interval is entered when the leading leg switches are turned-off. During this interval the transformer current reduces such that the lagging leg switches are turned-off at the end of the freewheeling interval with significantly lower currents. While this effect is not really relevant for other converters such as for example the phase-shifted full bridge converter, it presents a problem for LLC converters because the resonant capacitor voltage results in a significant decrease of the resonant current in this interval such that the lagging leg turns-off at a much smaller current.

By applying the disclosure in such a way to a LLC converter this imbalance may be eliminated or at least reduced to a large extent. Accordingly, the disclosure is preferably applied in a converter where the converter stage includes an LLC resonant tank. This means that the converter is a LLC converter.

In another preferred embodiment of the disclosure, the converter stage includes a series inductor and an inductor, where the series inductor is connected in series between the inverter full bridge and the transformer and the inductor is connected in parallel to the transformer. This configuration results in a phase-shifted full-bridge converter. Although the advantages of the disclosure do not manifest themselves to the same extent as, for example, in an LLC converter, the disclosure eliminates or reduces the thermal imbalances of the switches in a phase-shifted full-bridge converter.

In a further preferred embodiment of the disclosure, the rectifier includes a synchronous rectifier. This may either be a half-bridge rectifier or a full-bridge rectifier where the synchronous rectifier switches may be chosen according to the requirements of the particular application. Often, MOSFETs (metal oxide field effect transistors) or BJTs (bipolar junction transistors) are used.

Preferably, the synchronous rectifier includes a first controllable rectifier switch connected to a first output terminal of the transformer, a second controllable rectifier switch connected to a second output terminal of the transformer, where both controllable rectifier switches are connected to a first output terminal of the rectifier and where the secondary of the transformer includes a center-tap connected to a second output terminal of the rectifier.

The synchronous rectifier may however also be implemented as a full bridge rectifier with controllable switches avoiding a center-tapped secondary of the transformer. Depending on the particular application, either the center-tapped rectifier may be preferred over the full-bridge rectifier or vice versa. This is not only true for the synchronous rectifier but also for the diode rectifier as described below.

In a further preferred embodiment of the disclosure, the rectifier includes a full bridge diode rectifier. Such a rectifier includes four diodes connected in a bridge configuration with two half-bridges connected in parallel across the transformer output, each half-bridge including two diodes connected in series and where the common terminal of the two switches of a first half-bridge is connected to a first output terminal of the rectifier and the common terminal of the two switches of a second half-bridge is connected to a second output terminal of the rectifier.

A diode rectifier may however also be implemented as a center-tapped diode rectifier with only two diodes connected in a similar way as the two controllable switches of the center-tapped synchronous rectifier described above.

Further, it is to mention that a half-wave rectifier might generally be used as well, either implemented with diodes or with controllable switches. However, due to the increased efficiency, full bridge rectifiers are usually preferred.

In another preferred embodiment of the disclosure, the output stage includes an output filter with a capacitor connected between the output terminals of the rectifier. A load is then connected across the capacitor of the output stage.

In a further preferred embodiment of the disclosure, the switches of the inverter full bridge include a MOSFET such as for example silicon, silicon-carbide or gallium nitride MOSFETs. Other types of MOSFETs or more generally, other types of transistors may however be used as well. The best choice for the implementation of the switches depends on the particular application.

It should be noted that the converter may also include additional elements such as for example a DC/DC converter stage in front of the inverter full bridge. And further, the individual elements of the converter mentioned above may also include additional components as required by the particular application.

Other advantageous embodiments and combinations of features come out from the detailed description below and the entirety of the claims.

BRIEF DESCRIPTION OF THE DRAWINGS

The drawings used to explain the embodiments show:
FIG. 2, portion b) the resulting voltage and current of the inverter full bridge using the switching scheme shown in FIG. 2, portion a)

In the figures, the same components are given the same reference symbols.

PREFERRED EMBODIMENTS

Figure 1:
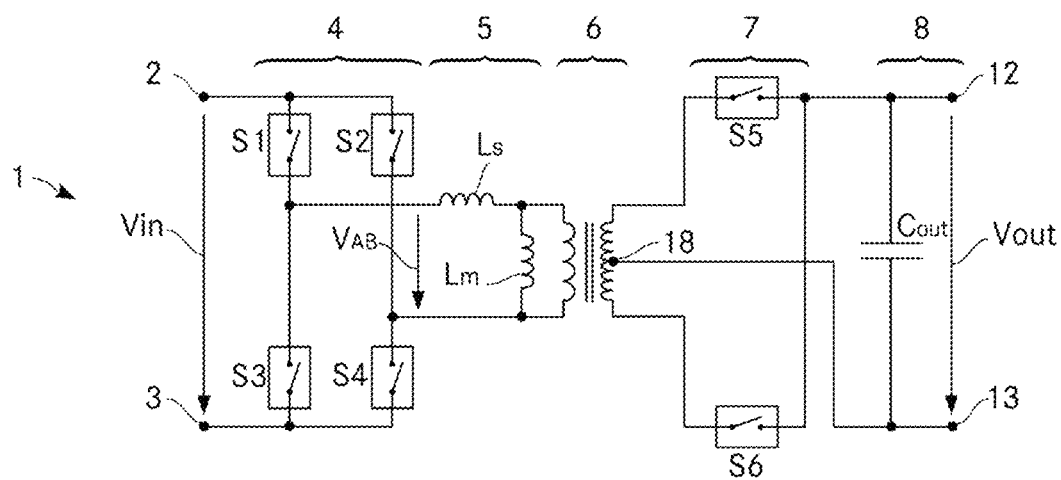
FIG. 1 a schematic circuit diagram of a phase-shifted full-bridge converter as known in the art.

FIG. 1 shows a schematic circuit diagram of a phase-shifted full-bridge converter 1 as known in the art. An input voltage Vin is connected across a first input terminal 2 and a second input terminal 3. The phase-shifted full-bridge converter 1 further includes an inverter full bridge 4, a phase-shifted full bridge 5 including a series inductor Ls in series and an inductor Lm in parallel with the primary of a transformer 6 having a center-tapped secondary, a rectifier 7 and an output stage 8.

The inverter full bridge 4 includes two half-bridges connected between the input terminals 2, 3 and each half-bridge having two switches connected in series. The first half-bridge includes switches S1 and S3 and the second half-bridge includes switches S2 and S4. The common terminal of switches S1, S3 is connected to the series inductor Ls and the common terminal of switches S2, S4 is connected to second terminal of the phase-shifted full bridge 5. The rectifier includes two synchronous rectifiers S5, S6, each connected to one of the output terminals of the transformer 6 and the other terminals of both synchronous rectifiers S5, S6 is connected to a first output terminal 12 of the output stage 8. The secondary of the transformer 6 includes a center-tap 18 that is connected to a second output terminal 13 of the output stage 8. The output stage includes an output capacitor Cout and the output voltage Vout is provided across the output terminals 12, 13.

Figure 2:
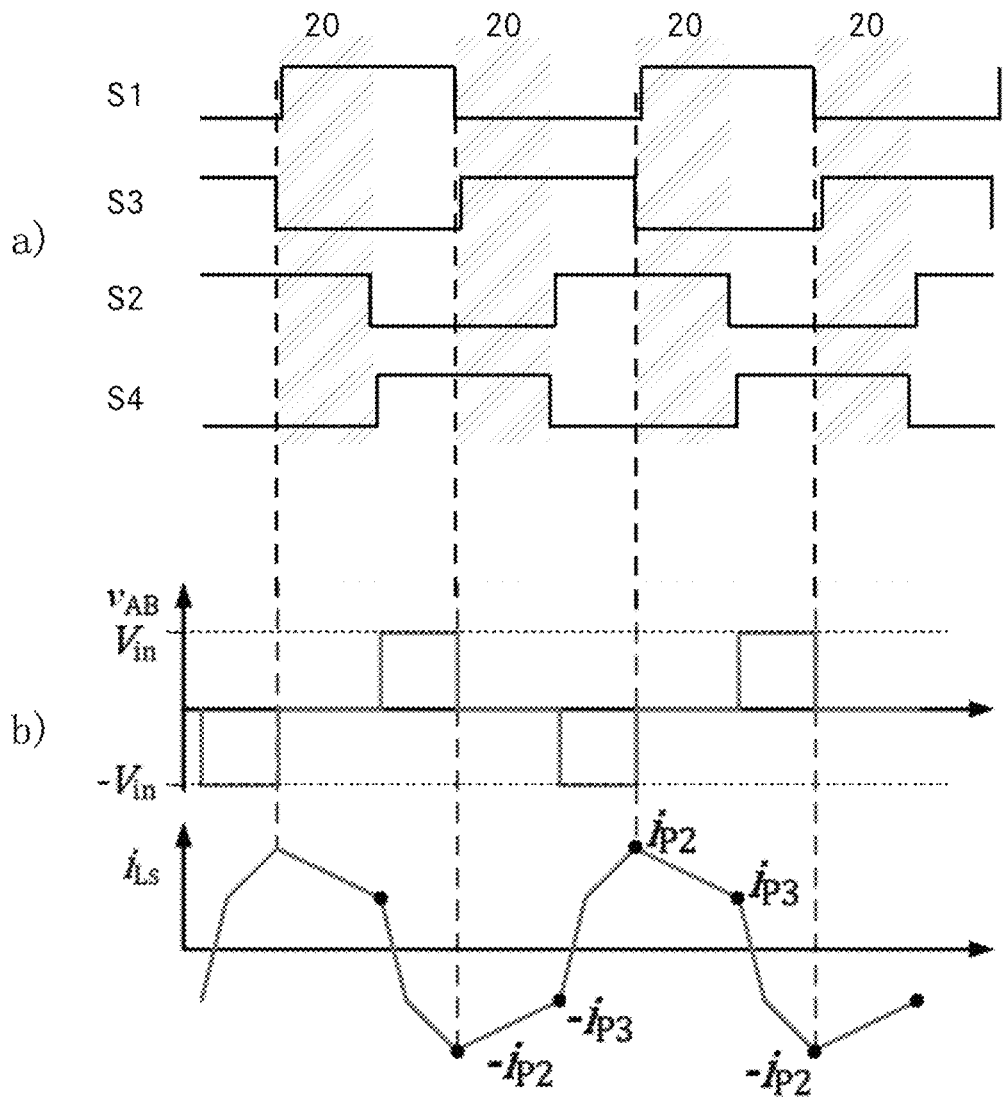
FIG. 2, portion a) a switching scheme for the phase-shifted full-bridge converter as shown in FIG. 1 according to the prior art.

FIG. 2, portion a) shows a switching scheme for the phase-shifted full-bridge converter as shown in FIG. 1. In the embodiment shown in FIG. 1-FIG. 2, the switches S1 and S3 are for example operated as the leading leg and the lagging leg switches are switches S2 and S4. In another embodiment, however, the switches S2 and S4 may be operated as the leading leg and the lagging leg switches are switches S1 and S3.

In phase-shift modulation both half legs of the inverter are operated with a duty cycle of about 50% where the modulation is phase-shifted for one leg to adjust the voltage transfer ratio. This modulation results in freewheeling intervals 20 in which both high-side switches S1 and S2 or both low-side switches S3 and S4 are conducting. The freewheeling intervals 20 are marked by the dashed areas.

The dead times of the switching scheme are not shown explicitly in the figures but just schematically in that the switch-on times are slightly delayed compared to the switch-off times of the switches.

FIG. 2, portion b shows the resulting output voltage $V_{AB}$ and output current $i_{LS}$ of the inverter full bridge using the switching scheme shown in FIG. 2, portion a).

As shown in FIG. 2, portion b, the leading leg switches S1, S3 are turned ON at the current $i_{P2}$ and they are also switched OFF at the current $i_{P2}$. The lagging lag switches S2, S4 are turned ON at the current $i_{P3}$ and they are also turned OFF at that current $i_{P3}$ where the absolute value of the current $i_{P2}$ is significantly larger than the absolute value of the current $i_{P3}$. In this 15 connection it is to note the currents $i_{P2}$ and $i_{P3}$ may be positive or negative but the absolute value is the same.

Accordingly, the switching scheme as shown in FIG. 2, portion a) has the disadvantage that the leading half bridge is always stressed with larger switching losses than the lagging leg. The switches S1, S3 of the leading leg are turned-off at a larger current whereas the switches S2, S4 of the lagging leg are turned-off at a substantially lower current. This lower turn-off current of the lagging leg may, furthermore, prevent ZVS for the leading leg adding to the switching losses, particularly in light load situations. The energy of the series inductor Ls may not be large enough to ensure ZVS for the lagging leg resulting in increased turn-on losses for the leading leg.

The freewheeling interval is entered when the leading leg switches S1, S3 are turned-off. During this interval the transformer current reduces such that the lagging leg switches S2, S4 are turned-off at the end of the freewheeling interval with significantly lower currents.

The larger switching losses result in a thermal imbalance of the switches of the leading leg and the lagging leg. The temperature of the switches of the leading leg is always larger.

Figure 3:
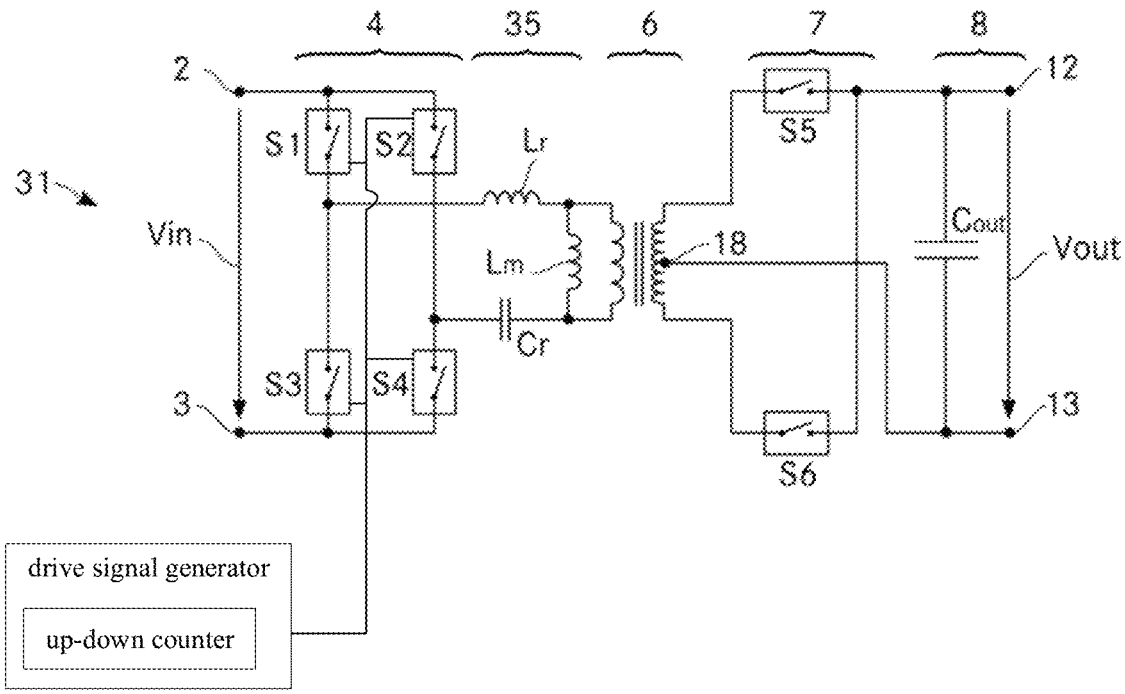
FIG. 3 a schematic circuit diagram of an LLC converter according to the disclosure.
Figure 5:
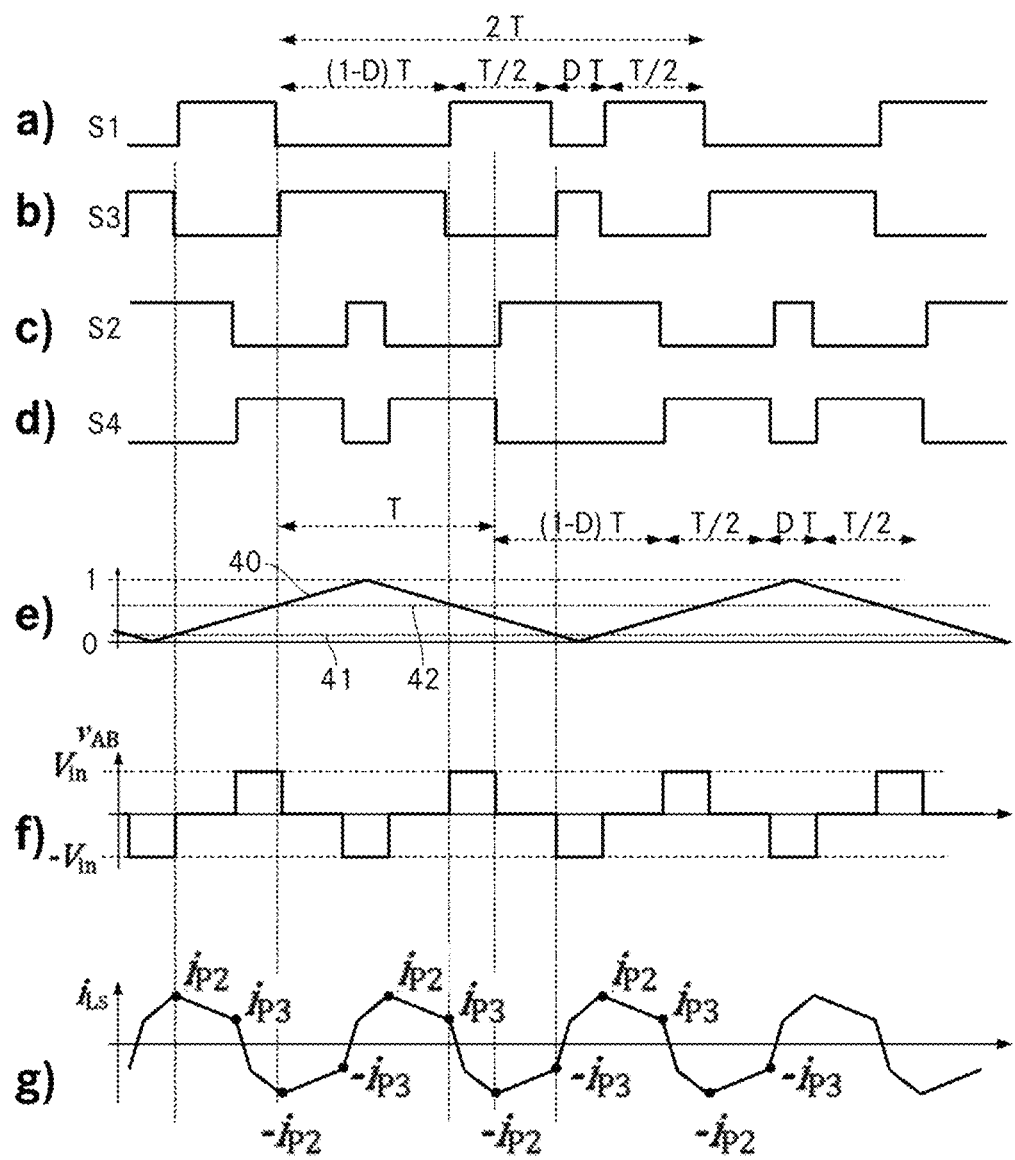
FIG. 5 the switching scheme according to the disclosure and the resulting voltage and current of the inverter full bridge.

FIG. 3 shows a schematic circuit diagram of an LLC converter 31 according to the disclosure, i. e. for applying the switching scheme according to the disclosure as shown in FIG. 5.

An input Voltage Vin is connected across a first input terminal 2 and a second input terminal 3. The LLC converter 31 further includes an inverter full bridge 4, a LLC resonant tank 35, a transformer 6 having a center-tapped secondary, a rectifier 7 and an output stage 8. The LLC resonant tank 35 includes a resonant inductor Lr, an inductor Lm and a resonant capacitor Cr. The resonant inductor Lr and the resonant capacitor Cr are connected in series and the inductor Lm is connected in parallel with the primary of a transformer 6.

The inverter full bridge 4 includes two half-bridges connected between the input terminals 2, 3 and each half-bridge having two switches connected in series. The first half-bridge includes switches S1 and S3 and the second half-bridge includes switches S2 and S4. The common terminal of switches S1, S3 is connected to the resonant inductor Lr and the common terminal of switches S2, S4 is connected to the resonant capacitor Cr. The rectifier includes two synchronous rectifiers S5, S6, each connected to one of the output terminals of the transformer 6 and the other terminals of both synchronous rectifiers S5, S6 is connected to a first output terminal 12 of the output stage 8. The secondary of the transformer 6 includes a center-tap 18 that is connected to a second output terminal 13 of the output stage 8. The output stage includes an output capacitor Cout and the output voltage Vout is provided across the output terminals 12, 13.

The switches S1-S4 are for example implemented using silicon carbide MOSFETs, silicon MOSFETs or gallium nitride MOSFETs. Other types of MOSFETs or more generally, other types of transistors may however be used as well. The best choice for the implementation of the switches depends on the particular application.

Figure 4:
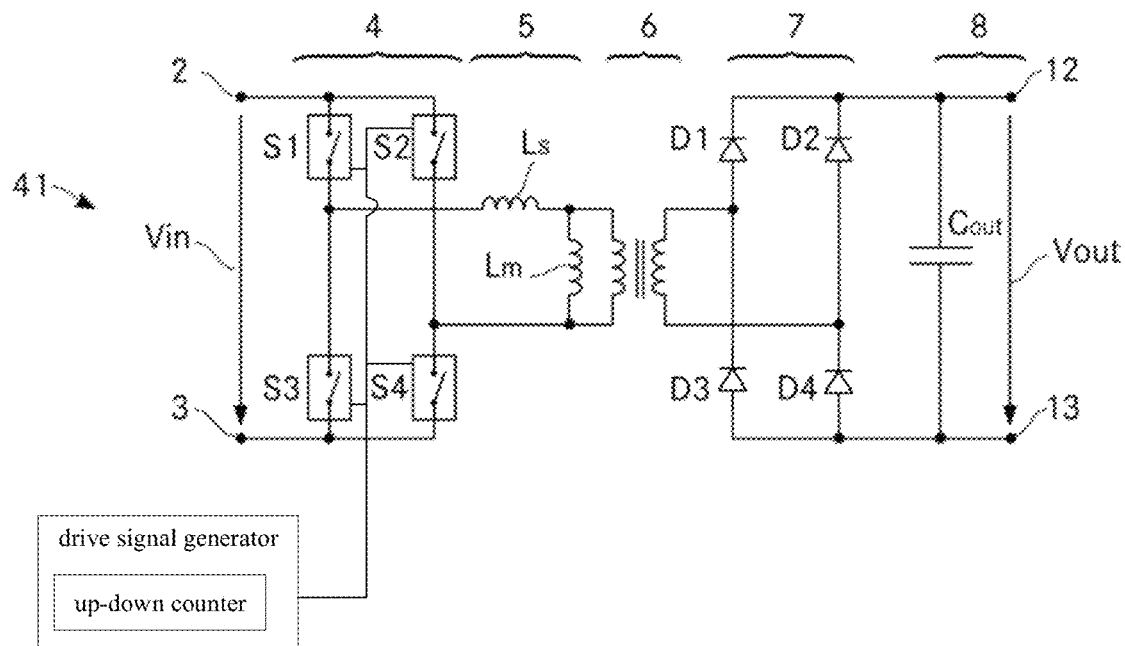
FIG. 4 a schematic circuit diagram of a phase-shifted full-bridge converter according to the disclosure.

FIG. 4 shows a schematic circuit diagram of a phase-shifted full-bridge converter 41 according to the disclosure, i. e. for applying the switching scheme according to the disclosure as shown in FIG. 5.

An input Voltage Vin is connected across a first input terminal 2 and a second input terminal 3. The phase-shifted full-bridge converter 1 further includes an inverter full bridge 4, a phase-shifted full bridge 5 including a series inductor Ls in series and an inductor Lm in parallel with the primary of a transformer 6, a rectifier 7 and an output stage 8.

The inverter full bridge 4 includes two half-bridges connected between the input terminals 2, 3 and each half-bridge having two switches connected in series. The first half-bridge includes switches S1 and S3 and the second half-bridge includes switches S2 and S4. The common terminal of switches S1, S3 is connected to the series inductor Ls and the common terminal of switches S2, S4 is connected to second terminal of the phase-shifted full bridge 5. The rectifier includes four diodes D1, D2, D3, D4 connected in a full bridge configuration across the secondary of the transformer 6. The common terminal of the diodes D1 and D2 is connected to a first output terminal 12 of the output stage 8 and the common terminal of the diodes D3 and D4 is connected to a second output terminal 13 of the output stage 8. The output stage includes an output capacitor Cout and the output voltage Vout is provided across the output terminals 12, 13.

Again, the switches S1-S4 are for example implemented using silicon carbide MOSFETs or silicon MOSFETs. Other types of MOSFETs or more generally, other types of transistors may however be used as well. The best choice for the implementation of the switches depends on the particular application.

FIG. 5 shows the switching scheme according to the disclosure which may be applied to the phase-shifted full-bridge converter 1 as shown in FIG. 1 including a center tapped synchronous rectifier, to the LLC converter 31 as shown in FIG. 3 including a center tapped synchronous rectifier as well as the phase-shifted full-bridge converter 41 as shown in FIG. 4 including a diode full bridge rectifier.

FIG. 5, portion a) shows the switching scheme for switch S1, FIG. 5, portion b) shows the switching scheme for switch S3, FIG. 5, portion c) shows the switching scheme for switch S2 and FIG. 5, portion d) shows the switching scheme for switch S4.

It is to be noted that the control signals as such, as generated by the drive signal generator, are not shown in FIG. 5.

And it is further to note that the dead times of the switching scheme are not shown explicitly in the figures but just schematically in that the switch-on times are slightly delayed compared to the switch-off times of the switches.

FIG. 5, portion e) shows the up-down counter 40 having a period that is twice as long as the period T of the input voltage Vin. The up-down counter 40 starts from its minimum value zero and ramps up to its maximum value 1 within one period T and then starts ramping down from its maximum value 1 to its minimum value zero again within one period T. The up-down counter 40 therefore has a period of 2T which is also designated as the modulation period $T_{mod}$. FIG. 5, portion e) further shows the first compare value 41 having a value of D/4 as well as the second compare value 42 having a value of (2+D)/4.

It is to note that in the example shown in FIG. 5 the first and the second compare value as shown in FIG. 5, portion e) is used for both half bridges, i. e. for the switches S1 and S3 as well as for the switches S2 and S4. Accordingly, the up-down counter for the switches S2 and S4 of the second half bridge includes a phase shift of T. For the sake of clarity, this up-down counter for the second half bridge is however not shown in FIG. 5.

Not shown in FIG. 5 is another example where no phase shift between the two half bridges is applied and the same up-down counter 40 is used for both half bridges. In this case, the compare values for the first half bridge would be same as shown in FIG. 5, portion e), namely the compare value 41 having the value D/4 and the second compare value 42 having the value (2+D)/4. However, the compare values for the second half bridge would be different. The first compare value would be (1−D/4) and the second compare value would be (1−(2+D)/4).

As can be seen from FIG. 5, portion a) to portion e):
switch S1 is switched ON when the up-down counter 40 crosses the first compare value 41 on an up-count of the up-down counter 40 and switch S1 is switched OFF when the up-down counter 40 crosses the second compare value 42 on an up-count of the up-down counter 40. And then, switch S1 is switched ON when the up-down counter 40 crosses the second compare value 42 on a down-count of the up-down counter 40 and switch S1 is switched OFF when the up-down counter 40 crosses the first compare value 41 on a down-count of the up-down counter 40;

switch S3 is switched OFF when the up-down counter 40 crosses the first compare value 41 on an up-count of the up-down counter 40 and switch S3 is switched ON when the up-down counter 40 crosses the second compare value 42 on an up-count of the up-down counter 40. And then, switch S3 is switched OFF when the up-down counter 40 crosses the second compare value 42 on a down-count of the up-down counter 40 and switch S3 is switched ON when the up-down counter 40 crosses the first compare value 41 on a down-count of the up-down counter 40.

Accordingly, switch S3 is switched interleaved to switch S1. As can further be seen from FIG. 5, portion a) to portion e), switch S2 is switched ON and OFF in the same way as switch S3 but including a phase shift of period T, and switch S4 is switched ON and OFF in the same way as switch S1 but also including a phase shift of period T.

Again, switches S2 and S4 are switched interleaved to each other.

FIG. 5, portion f) shows the resulting output voltage of the inverter full bridge 4 and FIG. 5, portion g) shows the resulting output current $i_{LS}$ of the inverter full bridge 4.

Whereas the output current $i_{LS}$ of the inverter full bridge 4 as shown in FIG. 5, portion g) does not differ from the output current $i_{LS}$ as shown in FIG. 2, portion b), it can be seen from FIG. 5, portion a) to portion d) that during a single modulation period $T_{mod}$=2T.

switch S1 is switched ON once at the current $i_{P3}$ and once at the current $i_{P2}$, switch S1 is switched OFF once at the current $i_{P3}$ and once at the current $i_{P2}$, switch S3 is switched ON once at the current $i_{P2}$ and once at the current $i_{P3}$ and switch S3 is switched OFF once at the current $i_{P3}$ and once at the current $i_{P2}$; And, switch S2 is switched ON once at the current $i_{P3}$ and once at the current $i_{P2}$, switch S2 is switched OFF once at the current $i_{P2}$ and once at the current $i_{P3}$, switch S4 is switched ON once at the current $i_{P3}$ and once at the current $i_{P2}$ and switch S4 is switched OFF once at the current $i_{P3}$ and once at the current $i_{P2}$.

Or in other words, all switches S1-S4 are switched ON and OFF at the same number of higher currents $i_{P2}$ and lower currents $i_{P3}$.

Accordingly, the switching scheme as shown in FIG. 5 does not have the disadvantage that one of the legs is stressed with larger switching losses than the other leg. The turn-off and the turn-on currents are the same for all switches over a single modulation period of 2T.

So, the thermal stress is the same for all switches S1-S4. And in the phase-shifted full-bridge converter, ZVS is not prevented in light load conditions due to too less energy of the series inductor.

The switching scheme according to the disclosure may not only be applied to the inverter configurations describe above, it may however also be applied to an LLC converter including a diode full bridge rectifier. And it may also be applied to other converter configurations including an inverter full bridge as described above independent of the particular implementation of the converter stage and the rectifier in the secondary.

In summary, it is to be noted that the disclosure enables to create a converter including an inverter full bridge and a corresponding closed modulation method that reduces or even eliminates the thermal imbalance of the switches of the inverter full bridge during operation.

What is claimed is:

1. A method for controlling a converter comprising an inverter full bridge with a first input terminal, a second input terminal, a first half bridge and a second half bridge connected across the first and second input terminals, wherein a input voltage having a period T is provided between the first and second input terminals, wherein each half bridge comprises a first switch and a second switch connected in series between the first and second input terminals, comprising:

generating drive signals for the switches with a pulse width modulation technique with a duty cycle D using an up-down counter having a period $T_{mod}$ being twice the period T, a first compare value for the first half bridge and a second compare value for the first half bridge, switching a first switch of the first half bridge ON at the first compare value for the first half bridge on an up-count of the up-down counter, switching the first switch of the first half bridge OFF at the second compare value for the first half bridge on an up-count of the up-down counter, switching the first switch of the first half bridge ON at the second compare value for the first half bridge on a down-count of the up-down counter, switching the first switch of the first half bridge OFF at the first compare value for the first half bridge on the down-count of the up-down counter, and switching a second switch of the first half bridge interleaved to the first switch of the first half bridge, wherein the first compare value for the first half bridge is D/4 and wherein the second compare value for the first half bridge is (2+D)/4.

2. The method according to claim 1, comprising:

switching a first switch of the second half bridge ON at a first compare value for the second half bridge on an up-count of the up-down counter, switching the first switch of the second half bridge OFF at a second compare value for the second half bridge on an up-count of the up-down counter, switching the first switch of the second half bridge ON at the second compare value for the second half bridge on a down-count of the up-down counter, switching the first switch of the second half bridge OFF at the first compare value for the second half bridge on the down-count of the up-down counter, and switching a second switch of the second half bridge interleaved to the first switch of the second half bridge, wherein the first compare value for the second half bridge is (1−D/4) and wherein the second compare value for the second half bridge is (1−(2+D)/4).

3. The method according to claim 2, wherein the up-down counter is ramped up from a minimum value to a maximum value during a first half of the modulator period $T_{mod}$ and then is ramped down from the maximum value to the minimum value during a second half of the modulator period $T_{mod}$, wherein the minimum value is zero and the maximum value is 1.

4. The method according to claim 1, wherein the up-down counter is ramped up from a minimum value to a maximum value during a first half of the modulator period $T_{mod}$ and then is ramped down from the maximum value to the minimum value during a second half of the modulator period $T_{mod}$, wherein the minimum value is zero and the maximum value is 1.

5. A converter comprising an inverter full bridge with a first input terminal, a second input terminal, a first half bridge and a second half bridge connected across the first and second input terminals, wherein each half bridge comprises a first switch and a second switch connected in series between the first and second input terminals, a drive signal generator for generating drive signals for the switches with a pulse width modulation technique with a duty cycle D, wherein the drive signal generator comprises an up-down counter having a first compare value for the first half bridge, a second compare value for the first half bridge and a period $T_{mod}$ being twice a period T of an input voltage for providing between the first and second input terminals, wherein the drive signal generator is adapted for generating drive signals for:
- switching a first switch of the first half bridge ON at the first compare value for the first half bridge on an up-count of the up-down counter, switching the first switch of the first half bridge OFF at the second compare value for the first half bridge on an up-count of the up-down counter,
- switching the first switch of the first half bridge ON at the second compare value for the first half bridge on a down-count of the up-down counter, switching the first switch of the first half bridge OFF at the first compare value for the first half bridge on the down-count of the up-down counter, and
- switching a second switch of the first half bridge interleaved to the first switch of the first half bridge,
- wherein the first compare value for the first half bridge is D/4 and wherein the second compare value for the first half bridge is (2+D)/4.

6. The converter according to claim 5, further comprising a transformer, a converter stage connected between the inverter full bridge and a primary side of the transformer, a rectifier connected to a secondary side of the transformer and an output stage connected to the rectifier, wherein an output power of the converter is provided across an output of the output stage.

7. The converter according to claim 6, wherein the converter stage comprises an LLC resonant tank.

8. The converter according to claim 7, wherein the rectifier comprises a synchronous rectifier.

9. The converter according to claim 7, wherein the rectifier comprises a diode full bridge rectifier.

10. The converter according to claim 7, wherein the output stage comprises an output filter with a capacitor connected between output terminals of the rectifier.

11. The converter according to claim 7, wherein the switches of the inverter full bridge comprise a MOSFET.

12. The converter according to claim 6, wherein the converter stage comprises a series inductor and an inductor, wherein the series inductor is connected in series between the inverter full bridge and the transformer and the inductor is connected in parallel to the transformer.

13. The converter according to claim 12, wherein the rectifier comprises a synchronous rectifier.

14. The converter according to claim 12, wherein the rectifier comprises a diode full bridge rectifier.

15. The converter according to claim 12, wherein the output stage comprises an output filter with a capacitor connected between output terminals of the rectifier.

16. The converter according to claim 6, wherein the rectifier comprises a synchronous rectifier.

17. The converter according to claim 16, wherein the synchronous rectifier comprises a first controllable rectifier switch connected to a first output terminal of the transformer, a second controllable rectifier switch connected to a second output terminal of the transformer, wherein both controllable rectifier switches are connected to a first output terminal of the rectifier and wherein the secondary of the transformer comprises a center-tap connected to a second output terminal of the rectifier.

18. The converter according to claim 6, wherein the rectifier comprises a diode full bridge rectifier.

19. The converter according to claim 6, wherein the output stage comprises an output filter with a capacitor connected between output terminals of the rectifier.

20. The converter according to claim 6, wherein the switches of the inverter full bridge comprise a MOSFET.

* * * * *